United States Patent
Zajac et al.

(10) Patent No.: US 12,433,581 B2
(45) Date of Patent: Oct. 7, 2025

(54) TENSIONABLE INTERCONNECTED ANCHORS WITH DOUBLE PUNCH INSERTER

(71) Applicant: ARTHREX, INC., Naples, FL (US)

(72) Inventors: Eric Zajac, Naples, FL (US); Andy Petry, Naples, FL (US); Derek Sullivan, Naples, FL (US)

(73) Assignee: Arthrex, Inc., Naples, FL (US)

( * ) Notice: Subject to any disclaimer, the term of this patent is extended or adjusted under 35 U.S.C. 154(b) by 191 days.

(21) Appl. No.: 17/408,954

(22) Filed: Aug. 23, 2021

(65) Prior Publication Data
US 2023/0056174 A1  Feb. 23, 2023

(51) Int. Cl.
*A61B 17/04* (2006.01)

(52) U.S. Cl.
CPC ...... *A61B 17/0401* (2013.01); *A61B 17/0466* (2013.01); *A61B 2017/0409* (2013.01); *A61B 2017/0464* (2013.01); *A61B 2017/0496* (2013.01)

(58) Field of Classification Search
CPC ............ A61B 17/0401; A61B 17/0466; A61B 2017/0409; A61B 2017/0464; A61B 2017/0496
See application file for complete search history.

(56) References Cited

U.S. PATENT DOCUMENTS

| | | |
|---|---|---|
| 6,436,110 B2 | 8/2002 | Bowman et al. |
| 6,554,852 B1 | 4/2003 | Oberlander |
| 7,118,581 B2 * | 10/2006 | Friden ............ A61F 2/0811 606/232 |
| 7,601,165 B2 | 10/2009 | Stone |
| 7,749,250 B2 | 7/2010 | Stone et al. |
| 7,828,850 B2 * | 11/2010 | Cauthen, III ........ A61F 2/442 623/17.16 |
| 7,857,830 B2 | 12/2010 | Stone et al. |
| 7,905,903 B2 | 3/2011 | Stone et al. |
| 7,905,904 B2 | 3/2011 | Stone et al. |
| 8,337,525 B2 | 12/2012 | Stone et al. |
| 8,632,569 B2 | 1/2014 | Stone et al. |
| 8,702,718 B2 | 4/2014 | Bhatnagar et al. |
| 8,790,369 B2 | 7/2014 | Orphanos et al. |
| 8,961,538 B2 | 2/2015 | Koogle, Jr. et al. |
| 9,107,653 B2 | 8/2015 | Sullivan |
| 9,314,235 B2 | 4/2016 | Bojarski et al. |

(Continued)

FOREIGN PATENT DOCUMENTS

EP 2698117 A1 2/2014

OTHER PUBLICATIONS

International Search Report for International Application No. PCT/US2022/037865 dated Nov. 14, 2022.

(Continued)

*Primary Examiner* — Elizabeth Houston
*Assistant Examiner* — Jonathan A Hollm
(74) *Attorney, Agent, or Firm* — Carlson, Gaskey & Olds, P.C.

(57) ABSTRACT

A surgical tool assembly includes a handle, a shaft extending from the handle, a first prong distal to and fixed relative to the shaft, and a second prong distal to and fixed relative to the shaft. A first anchor is disposed on the first prong, and a second anchor is disposed on the second prong. A first suture interconnects the first anchor and the second anchor.

6 Claims, 12 Drawing Sheets

(56) References Cited

U.S. PATENT DOCUMENTS

| | | |
|---|---|---|
| 9,421,012 B2 | 8/2016 | Orphanos et al. |
| 9,445,806 B2 | 9/2016 | Hart et al. |
| 9,561,025 B2 | 2/2017 | Stone et al. |
| 9,622,736 B2 | 4/2017 | Stone et al. |
| 9,737,292 B2 | 8/2017 | Sullivan et al. |
| 9,855,028 B2 | 1/2018 | Vijay et al. |
| 9,855,029 B2 | 1/2018 | Sullivan |
| 9,867,607 B2 | 1/2018 | Sullivan |
| 10,123,796 B2 | 11/2018 | Westling et al. |
| 10,136,886 B2 | 11/2018 | Norton et al. |
| 10,149,675 B2 | 12/2018 | Orphanos et al. |
| 10,258,320 B2 | 4/2019 | Dreyfuss et al. |
| 10,729,423 B2 | 8/2020 | Kaiser et al. |
| 10,806,443 B2 | 10/2020 | Norton et al. |
| 2004/0138683 A1 | 7/2004 | Shelton et al. |
| 2007/0142838 A1 | 6/2007 | Jordan |
| 2008/0140092 A1* | 6/2008 | Stone ............... A61B 17/0469 606/139 |
| 2009/0065120 A1 | 3/2009 | Ueno et al. |
| 2011/0270278 A1* | 11/2011 | Overes ............... A61B 17/0487 606/228 |
| 2014/0142627 A1 | 5/2014 | Hendricksen et al. |
| 2016/0296223 A1* | 10/2016 | Monllor ............. A61B 17/0401 |
| 2018/0221010 A1* | 8/2018 | Lund .................. A61B 17/0401 |
| 2019/0059883 A1 | 2/2019 | Westling et al. |
| 2020/0197002 A1 | 6/2020 | Stone et al. |
| 2020/0276017 A1 | 9/2020 | Subramanian et al. |
| 2021/0251622 A1 | 8/2021 | Ryan |
| 2021/0275290 A1* | 9/2021 | Domecus ............. A61F 2/0811 |

OTHER PUBLICATIONS

International Preliminary Report on Patentability for International Application No. PCT/US2022/037865 dated Mar. 7, 2024.

\* cited by examiner

TENSIONABLE INTERCONNECTED ANCHORS WITH DOUBLE PUNCH INSERTER

BACKGROUND

This disclosure relates to surgical tools and, in particular, surgical tools utilized to introduce suture anchors to a surgical site.

SUMMARY

Surgical tools and techniques for introducing one or more suture anchors at a surgical site are described herein.

The described surgical tools include multiple prongs fixed relative to a shaft and may be utilized to introduce multiple suture anchors to a surgical site in a single step. The suture anchors may be interconnected with one or more sutures that may be utilized to apply compression to one or more of a graft, soft tissue, and bone.

A surgical tool assembly according to an exemplary aspect of the present disclosure includes a handle, a shaft extending from the handle, a first prong distal to and fixed relative to the shaft, and a second prong distal to and fixed relative to the shaft. A first anchor is disposed on the first prong, and a second anchor is disposed on the second prong. A first suture interconnects the first anchor and the second anchor.

A method according to an exemplary aspect of the present disclosure includes delivering a surgical tool assembly to a surgical site. The surgical tool assembly includes a pronged surgical tool, a first anchor, and a second anchor, which is interconnected to the first anchor. In the method, a first and second prong of the pronged surgical tool are inserted simultaneously through a soft tissue and a bone. The first and second prongs are removed, such that the first and second anchors remain at the surgical site.

A method according to an exemplary aspect of the present disclosure includes delivering a surgical tool assembly to a surgical site. The surgical tool assembly includes a pronged surgical tool, a first anchor, and a second anchor, which is interconnected to the first anchor by a first and second suture. In the method, a first and second prong of the pronged surgical tool are inserted simultaneously through a graft, a soft tissue, and into a bone. The first and second prongs are removed, such that the first and second anchors remain in the bone. The first and second suture are tensioned by sliding the first and second sutures within the first and second anchors.

These and other features and advantages of the invention will be more apparent from the following detailed description that is provided in connection with the accompanying drawings and illustrated exemplary embodiments of the invention

DETAILED DESCRIPTION

This disclosure describes surgical tool assemblies and techniques for introducing one or more suture anchors at a surgical site. The surgical tools may be used to affix soft tissue to bone, to affix a graft to soft tissue, and/or to affix a graft to bone.

In some embodiments, the surgical site is one configured for a graft augmentation technique for repairing or reconstructing an unstable joint, such as in response to a massive irreparable rotator cuff tear or other injury. Although graft augmentation techniques associated with a shoulder joint are described throughout this disclosure as embodiments, this disclosure is not intended to be limited to shoulder surgeries. In other words, the various techniques described herein may be employed to reconstruct and/or improve the functionality of any joint of the human musculoskeletal system.

Figure 1:
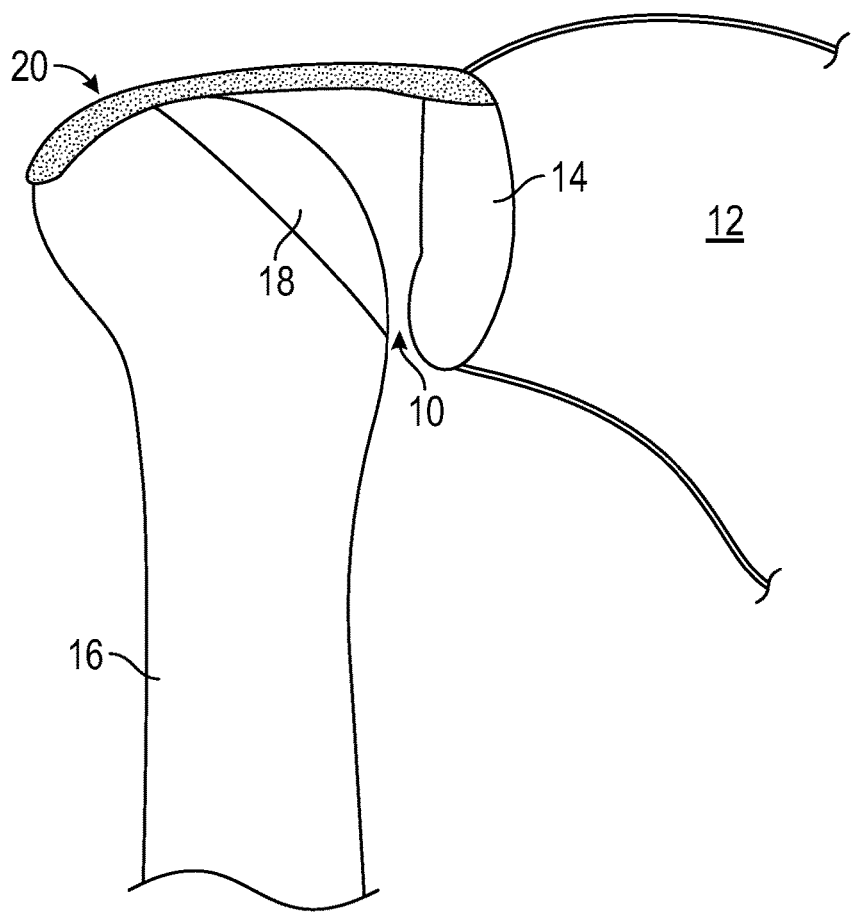
FIG. 1 illustrates a joint of a human musculoskeletal system.

FIG. 1 illustrates a joint 10 of the human musculoskeletal system. The joint 10 may be any joint of the musculoskeletal system of the human body. In an embodiment, the joint 10 is the glenohumeral joint of a shoulder. The joint 10 includes multiple bones including a scapula 12 and a humerus 16. Some of these bones articulate relative to one another. For example, the joint 10 includes a ball and socket joint formed between a head 18 of the humerus 16 and a glenoid 14, which is a cup-like recession of the scapula 12 configured to receive the head 18.

A capsule 20 generally covers the joint 10 and is surrounded and reinforced by various muscles, tendons and ligaments that are responsible for keeping the adjoining bones of the joint 10 together. The joint 10 may become unstable if there is significant disruption of the articulating bones (e.g., the humerus 16 and the glenoid 14), the capsule 20, or other surrounding muscles, tendons and/or ligaments. In an embodiment, the joint 10 could become unstable in response to a massive irreparable rotator cuff tear.

Figure 2:
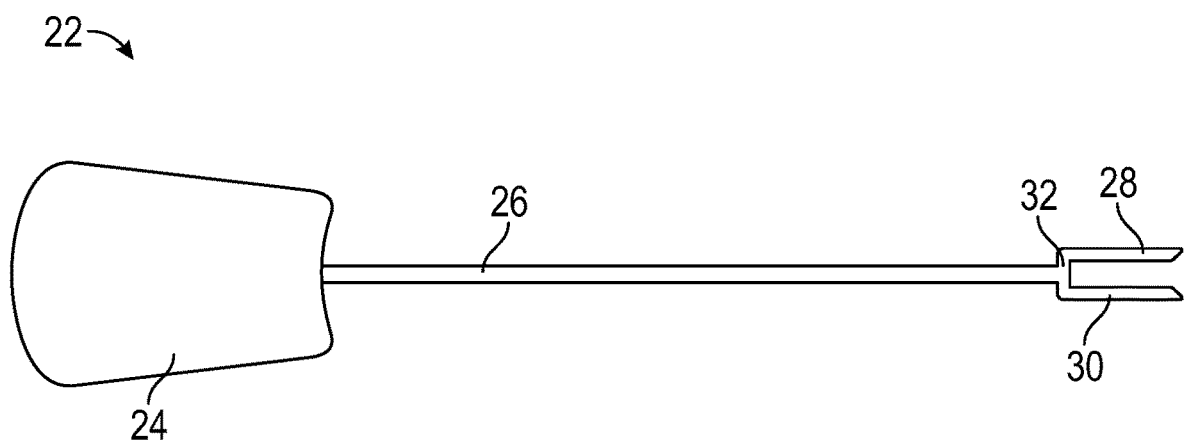
FIG. 2 illustrates an exemplary surgical tool.

FIG. 2 illustrates an exemplary surgical tool 22 that may be used in a surgical procedure, such as a graft augmentation technique, for example. In other embodiments, the surgical tool 22 may be utilized in other surgical procedures, such as any procedure for securing tissue to bone, tissue to other tissue, graft to bone or tissue, etc. The surgical tool 22 may include a handle 24 and a shaft 26 extending from the handle 24. The exemplary shaft 26 may be fixed relative to the handle 24. Two prongs 28, 30 may be distal from and are fixed relative to the shaft 26. In some embodiments, as shown, a bridge 32 may be fixed transversely to the shaft 26 for integrally connecting the prongs 28, 30 to the shaft 26. The prongs 28, 30 may extend distally away from the bridge 32. In some embodiments, more than two prongs may be provided.

Figure 3:
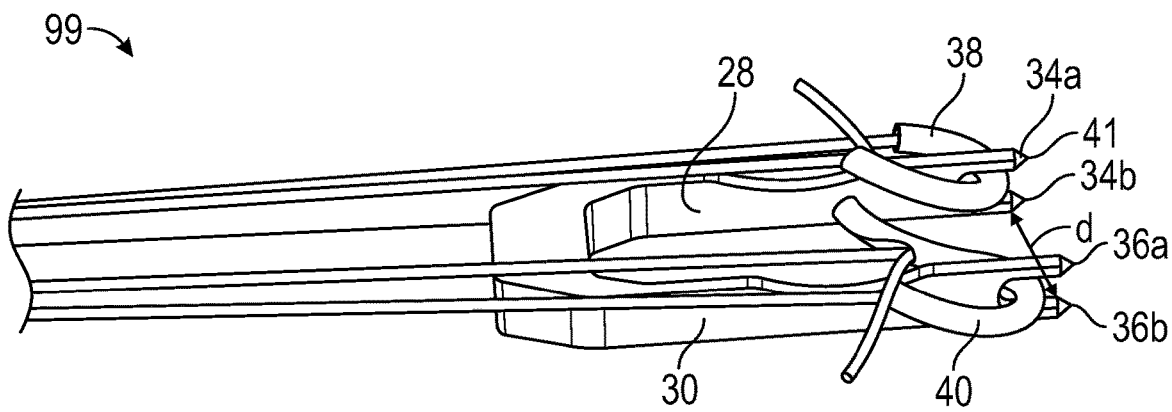
FIG. 3 illustrates the exemplary surgical tool of FIG. 2 loaded with suture anchors to establish a surgical tool assembly.

FIG. 3 illustrates the exemplary surgical tool 22 of FIG. 2 loaded with two anchors 38, 40 to establish a surgical tool assembly 99. The first anchor 38 may be provided on the first prong 28, and the second anchor 40 may be provided on the second prong 30. The exemplary first prong 28 may include pointed distal tips 34a, 34b, and the exemplary second prong 30 may include pointed distal tips 36a, 36b. The pointed distal tips 34a, 34b, 36a, 36b may be utilized to pierce one or more of graft, soft tissue, and bone during as surgical procedure, as detailed further below. More or fewer tips per prong may be provided in some embodiments.

In some embodiments, as shown, a portion of the first anchor 38 may be received between the distal tips 34a, 34b, and a portion of the second anchor 40 may be similarly configured with respect to the distal tips 36a, 36b. One or more of the distal tips 34a, 34b, 36a, 36b may include one or more sharp edges 41. In some embodiments, the one or more sharp edges 41 allow the respective tip 34a, 34b, 36a, 36b to penetrate bone (not shown) through an applied force for seating the anchors 38, 40 to a predetermined depth in the bone. The prongs 28,30 may be positioned at a predetermined distance d apart for implanting the anchors 38, 40 at the predetermined distance d apart.

Figure 4:
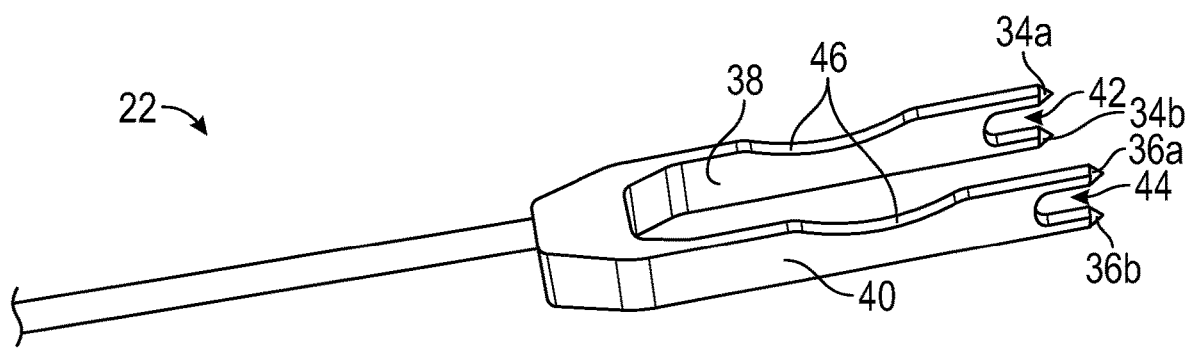
FIG. 4 illustrates the distal portion of the exemplary surgical tool of FIGS. 2 and 3.

FIG. 4 illustrates the distal portion of the exemplary surgical tool 22 of FIGS. 2 and 3 without the suture anchors 38, 40 loaded thereon. A saddle 42 may be provided by the pointed distal tips 34a, 34b, and a saddle 44 may be provided by the pointed distal tips 36a, 36b. The saddle 42 may be contoured to receive the first anchor 38 (see FIG. 3), and the saddle 44 may be contoured to receive the second anchor 40 (see FIG. 3). Although the saddles 42 of the prongs 28, 30 are shown at the distal ends therefore, other locations for receiving the anchors 38, 40 are also contemplated within the scope of this disclosure. For example, the saddles could be located at an upper or lower outer surface of the prongs 28, 30 at any location between the distal ends and the bridge 32.

With reference to FIGS. 3 and 4, the saddles 42, 44 are configured to engage external rounded surfaces of the respective anchors 38, 40. As shown in FIG. 4, in some embodiments, the prongs 28, 30 may further include notches 46 to accommodate suture, such as one or more suture strands that are arranged to interconnect the anchors 38, 40 as discussed further below, while the prongs 28, 30 are inserted into bone or tissue.

Figure 5A:
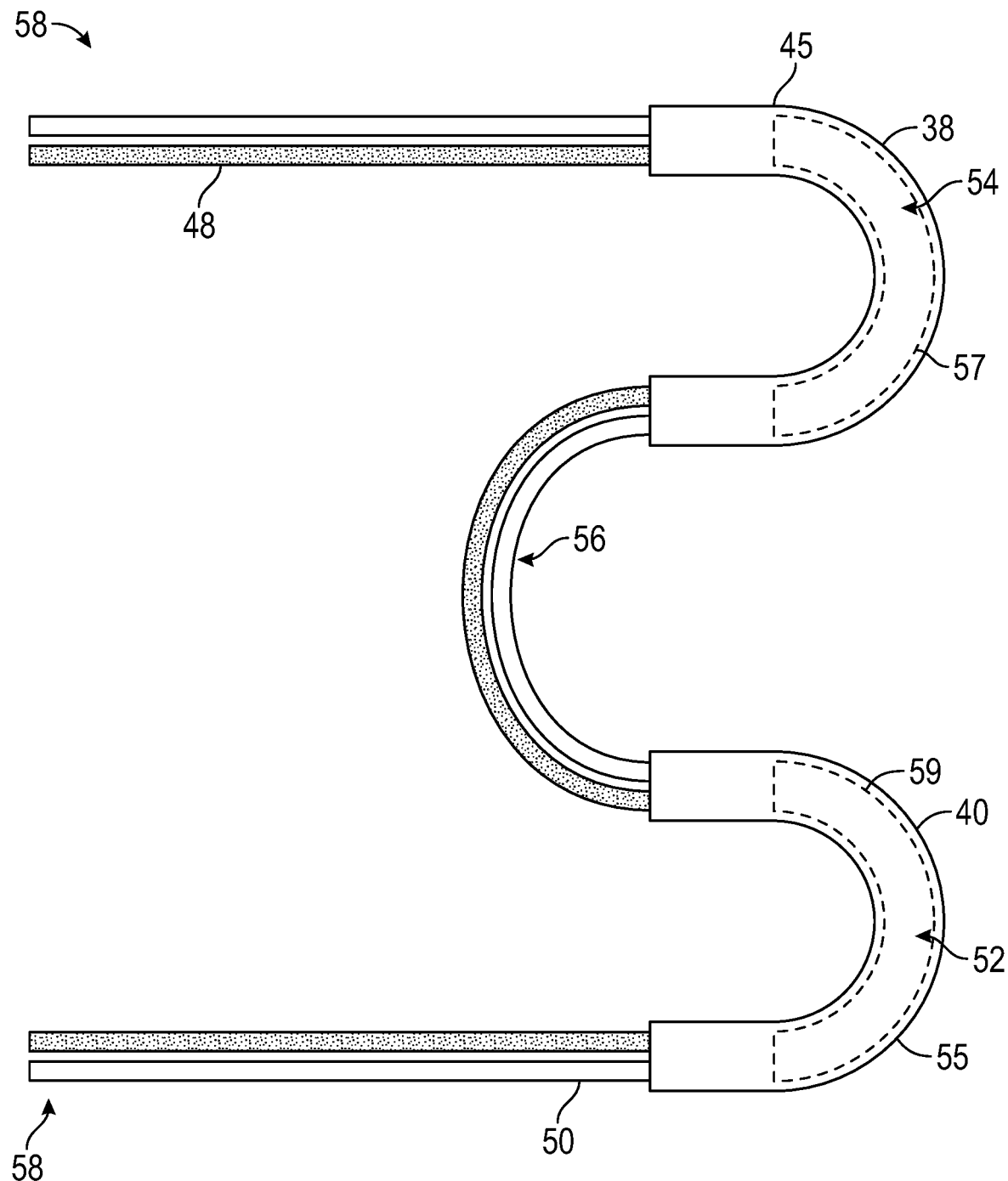
FIG. 5A schematically illustrates an exemplary suture anchor and suture configuration.

FIG. 5A further illustrates an exemplary suture anchor and suture configuration with the exemplary anchors 38, 40 of FIG. 3. Each anchor 38, 40 may be made exclusively of suture-based materials. Therefore, the anchors 38, 40 may be referred to as "soft" suture anchors. The suture-based materials confer the anchors 38, 40 with the ability to be inserted into bone sockets/holes and bunch together, collapse, expand and/or change shape to fixate within the socket/hole. In some embodiments, soft suture-based materials may include yarns, fibers, filaments, strings, fibrils, strands, sutures, etc., or any combination of such materials. The soft suture-based materials may be synthetic or natural materials, or combinations of synthetic and natural materials, and may be bio-degradable or non-degradable within the scope of this disclosure.

The anchor 38 may include a first tubular sheath 45 and a first suture 48 passed through the tubular sheath 45, and the anchor 40 may include a second tubular sheath 55 and a second suture 50 passed through the second tubular sheath 55. The anchors 38, 40 may be interconnected by one or both of the sutures 48, 50. For example, the first suture 48 may interconnect the tubular sheaths 45, 55 of the anchors 38, 40. In some embodiments, as shown, the second suture 50 may interconnect the tubular sheaths 45, 55 of the anchors 38, 40.

In some embodiments, the first suture 48 is spliced through the second suture 50 at a first splice section 52 (shown schematically). In some embodiments, splices lock the suture once it has been tightened between the two anchors and the tissue pulled down to bone. The first splice section 52 may be positioned within the second tubular sheath 55. The second suture 50 may additionally or alternatively be spliced through the first suture 48 at a second splice section 54. The second splice section 54 may be positioned within the first tubular sheath 45. In some embodiments, the splices may be formed with a splicing device, such as an additional suture or wire, for example. The sutures 48, 50 provide bridge portions 56 that are tensionable by pulling the free ends 58 of the sutures 48, 50. As explained further below, the bridge portions 56 may be utilized to apply compression to a graft or soft tissue located between the anchors 38, 40. In some embodiments greater or fewer than two sutures 48, 50 may be utilized as part of the surgical tool assembly 99.

The tubular sheaths 45, 55 of the anchors 38, 40 may provide internal passageways 57, 59 for receiving the sutures 48, 50. The tubular sheaths 45, 55 may be positioned over the splice sections 52, 54 as shown.

Figure 5B:
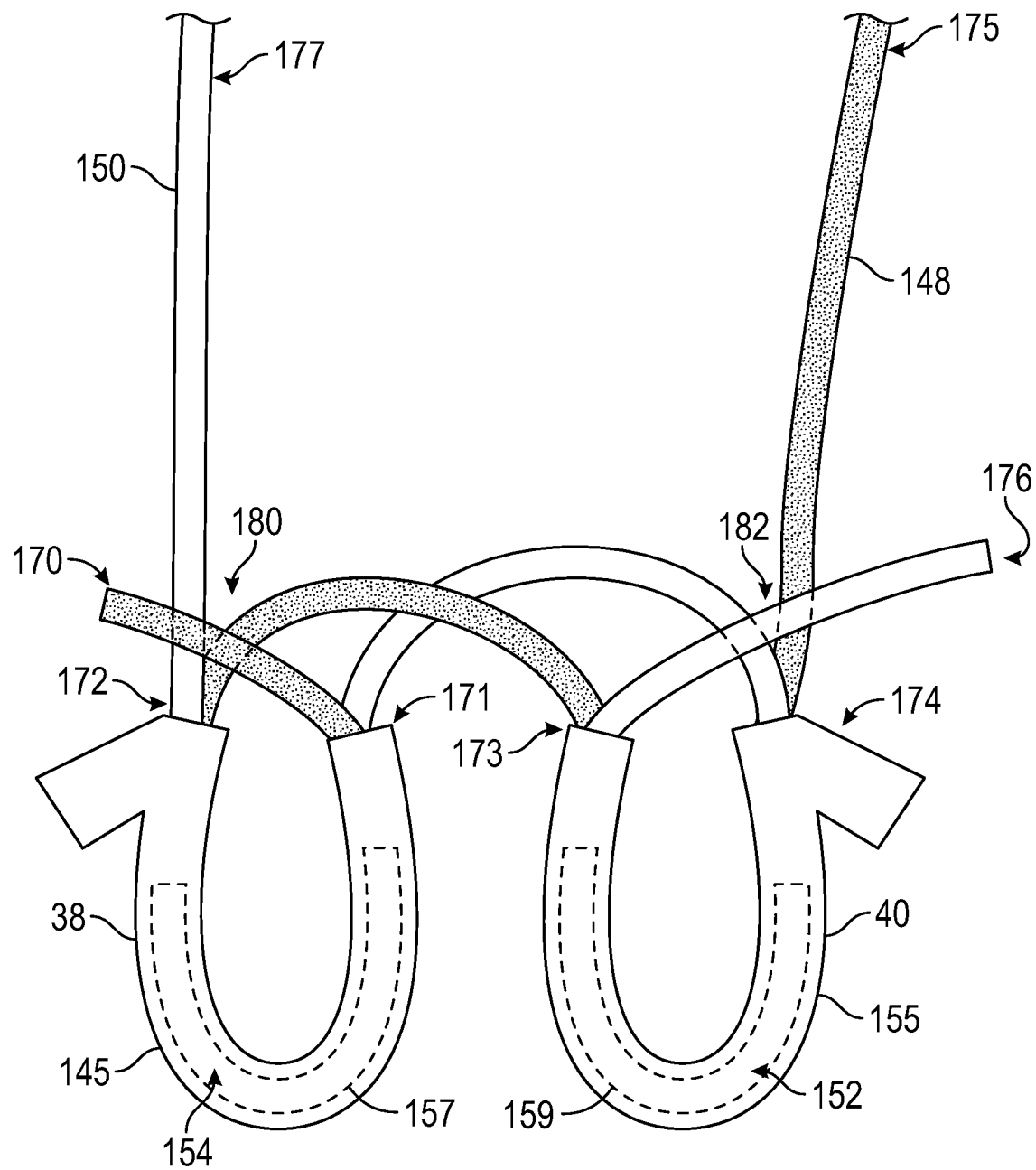
FIG. 5B schematically illustrates another exemplary suture anchor and suture configuration.

FIG. 5B illustrates another exemplary suture anchor and suture configuration of suture anchors 38, 40 having first and second splice sections 152, 154 within tubular sheaths 145, 155. It should be understood that like reference numerals identify corresponding or similar elements throughout the several drawings. The first splice section 152 may be positioned within the second tubular sheath 155. The second suture 150 may be spliced through the first suture 148 at a second splice section 154. The second splice section 154 may be positioned within the first tubular sheath 145.

As shown, the first suture 148 includes a first end 170 and passes into a first end 171 of the tubular sheath 145, out of a second end 172 of the tubular sheath 145, into a first end 173 of the second tubular sheath 155, splicing through the second suture 150 at splice section 152, and passes out of the second end 174 of the second tubular sheath 155 to second end 175. The second suture 150 includes a first end 176 that passes through the first end 173, the second end 174, the first end 171, splices through the first suture 148 at the splice section 154, and passes out the second end 172 to a second end 177. The sutures may be tensioned by a surgeon by pulling on the free ends 175, 177.

In some embodiments, as shown, the sutures 148 and 150 are spliced through the suture end 170, and the sutures 148 and 150 are spliced through the suture end 176. More specifically, as shown, at splice section 180, the suture end 177 may splice through the suture end 170, the suture 148 may splice through the end 170 as it passes from sheath end 172 to sheath end 173. Alternatively or additionally, as shown, at splice section 182, the suture end 175 may splice through the suture end 176, and the suture 150 may splice through the suture end 176 as it passes from sheath end 174 to sheath end 171. In some examples, in such a self-bunching design, when a surgeon pulls on a repair suture it constricts the suture loop that is created by piercing the suture through itself and deploys the bunching effect that sets the anchor 38,40, such as under the cortical bone.

Figure 5C:
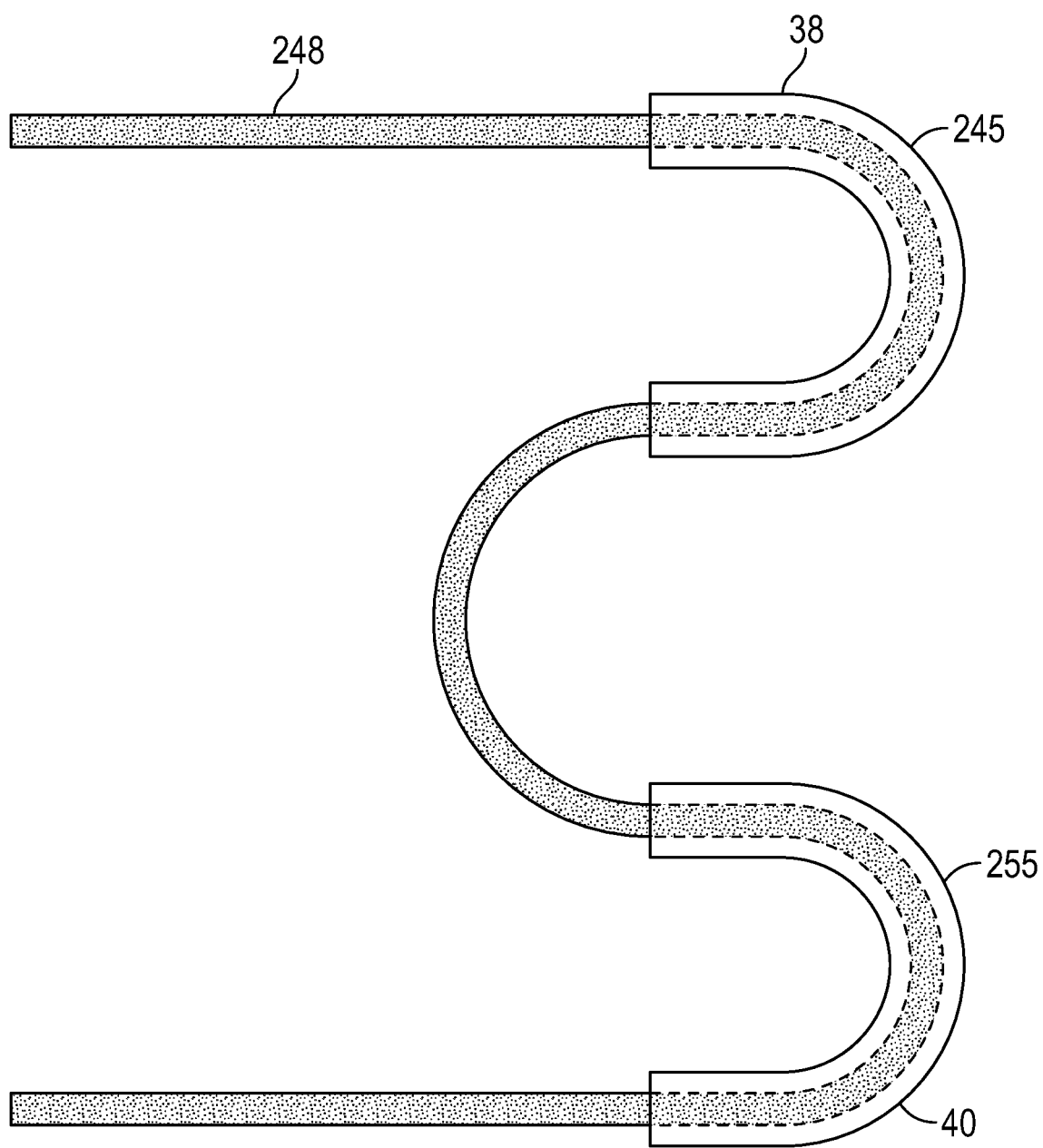
FIG. 5C schematically illustrates yet another exemplary suture anchor and suture configuration.

As shown in FIG. 5C, another exemplary suture anchor and suture configuration for the suture anchors 38, 40 includes a single suture 248 utilized to interconnect tubular sheaths 245, 255 in some embodiments.

Figure 5D:
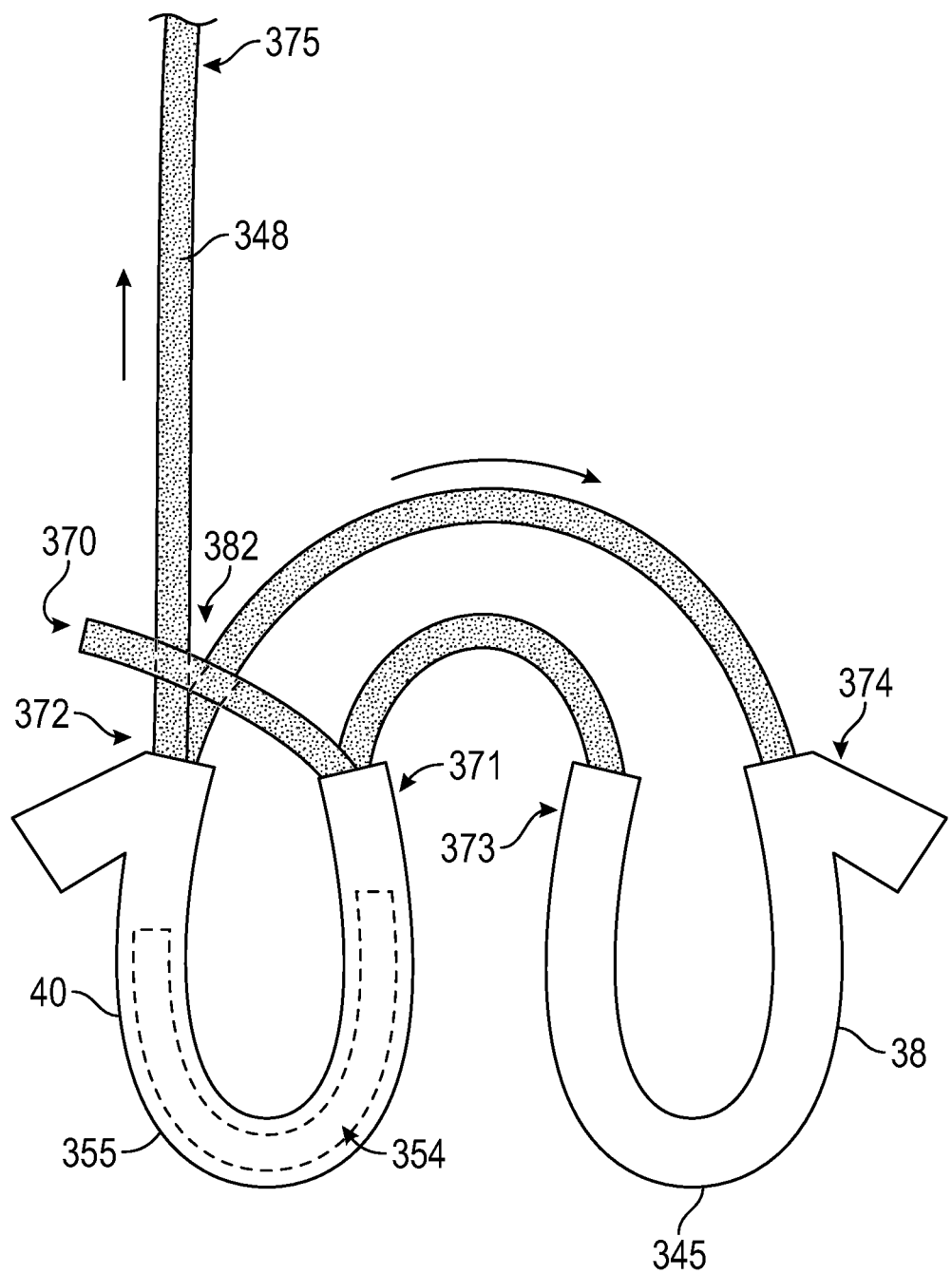
FIG. 5D schematically illustrates yet another exemplary suture anchor and suture configuration.

FIG. 5D illustrates exemplary suture anchor and suture configuration for the suture anchors 38, 40 utilizing a single suture 348 to interconnect the tubular sheaths 345, 355. The suture 348 includes an end 170 and passes through the first end 371 of the tubular sheath 355, through the second end 372 of the tubular sheath 355, through the end 374 of the tubular sheath 345, out the end 373 of the tubular sheath 345, back through the sheath end 371, splices through itself at splice section 354, passes out the sheath end 372 to provide free end 375. The free end 375 may splice through the end 370 at splice section 382 as shown. The suture 348 may additionally or alternatively splice through end 370 as it passes from sheath end 372 to sheath end 374.

Figure 5E:
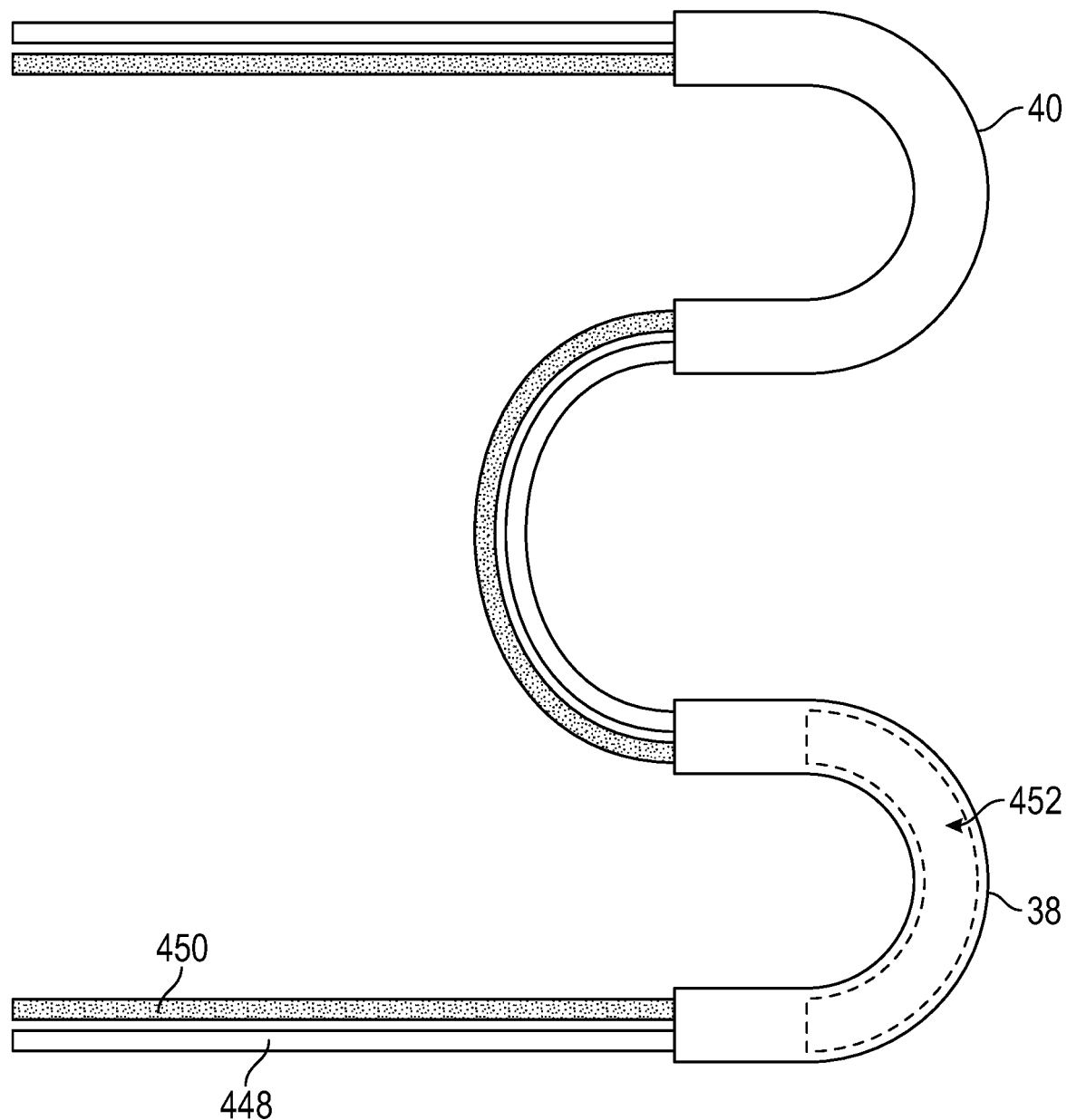
FIG. 5E schematically illustrates yet another exemplary suture anchor and suture configuration.

As shown in FIG. 5E, in another exemplary suture anchor and suture configuration for the suture anchors 38, 40, there may only be a single splice of one suture through the other, such as the first suture 448 being spliced through the second suture 450 at a first splice section 452 or vice versa.

Figure 5F:
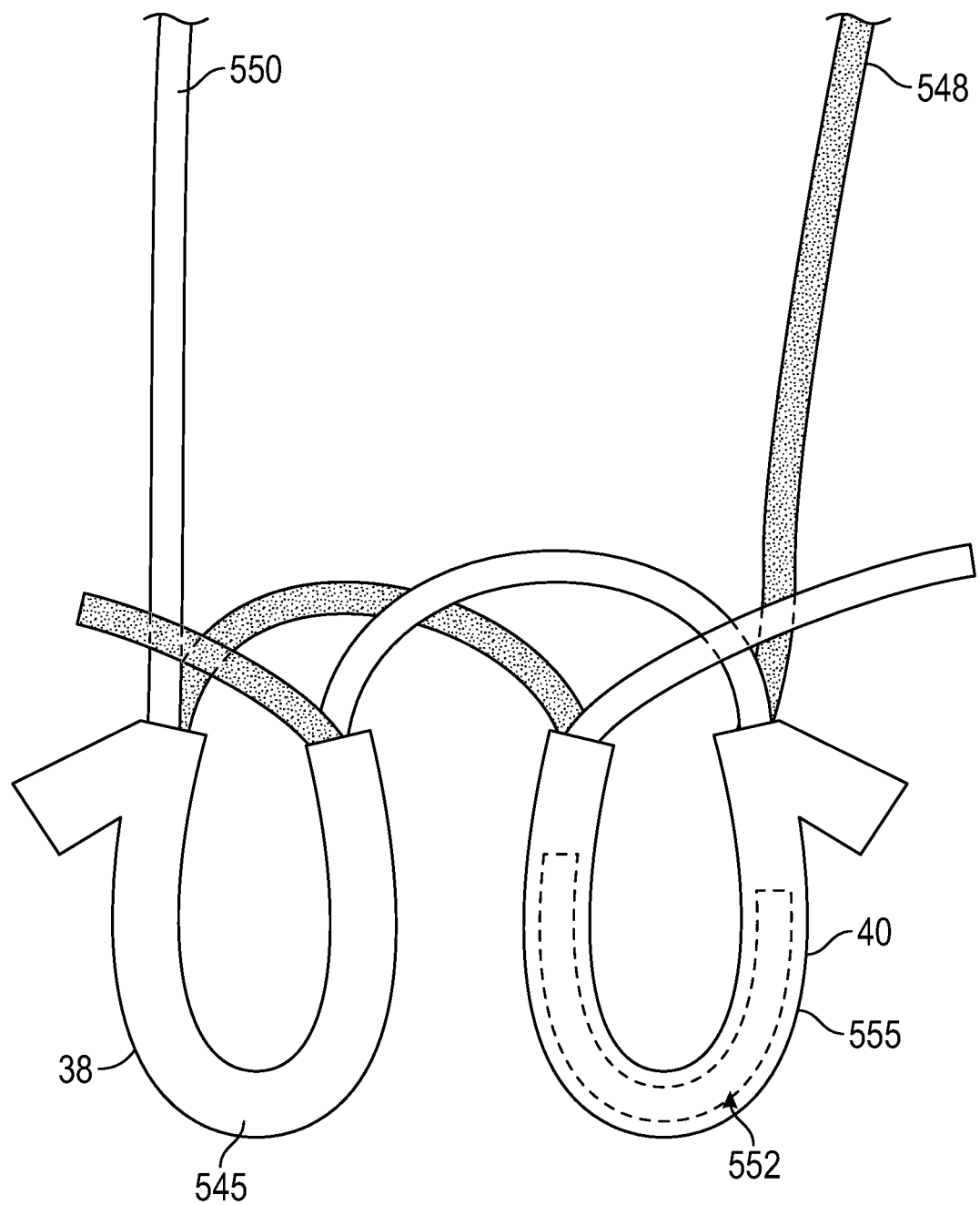
FIG. 5F schematically illustrates yet another exemplary suture anchor and suture configuration.

FIG. 5F shows another exemplary suture anchor and suture configuration for the suture anchors 38, 40 in which there is a splice of one suture through the other within only one of the respective tubular sheaths. The configuration of FIG. 5F is substantially similar to that shown in FIG. 5B, except that the tubular sheath 555 includes splice section 552 in which suture 548 splices through suture 550, and the tubular sheath 545 is free of a splice section.

In some embodiments, the splices described herein may be performed before the anchors 38, 40 are inserted. In other embodiments, the splices described herein may be performed after the anchors 38, 40 are inserted. The exemplary sutures disclosed may be slidable within the anchors 38, 40.

Figure 6:
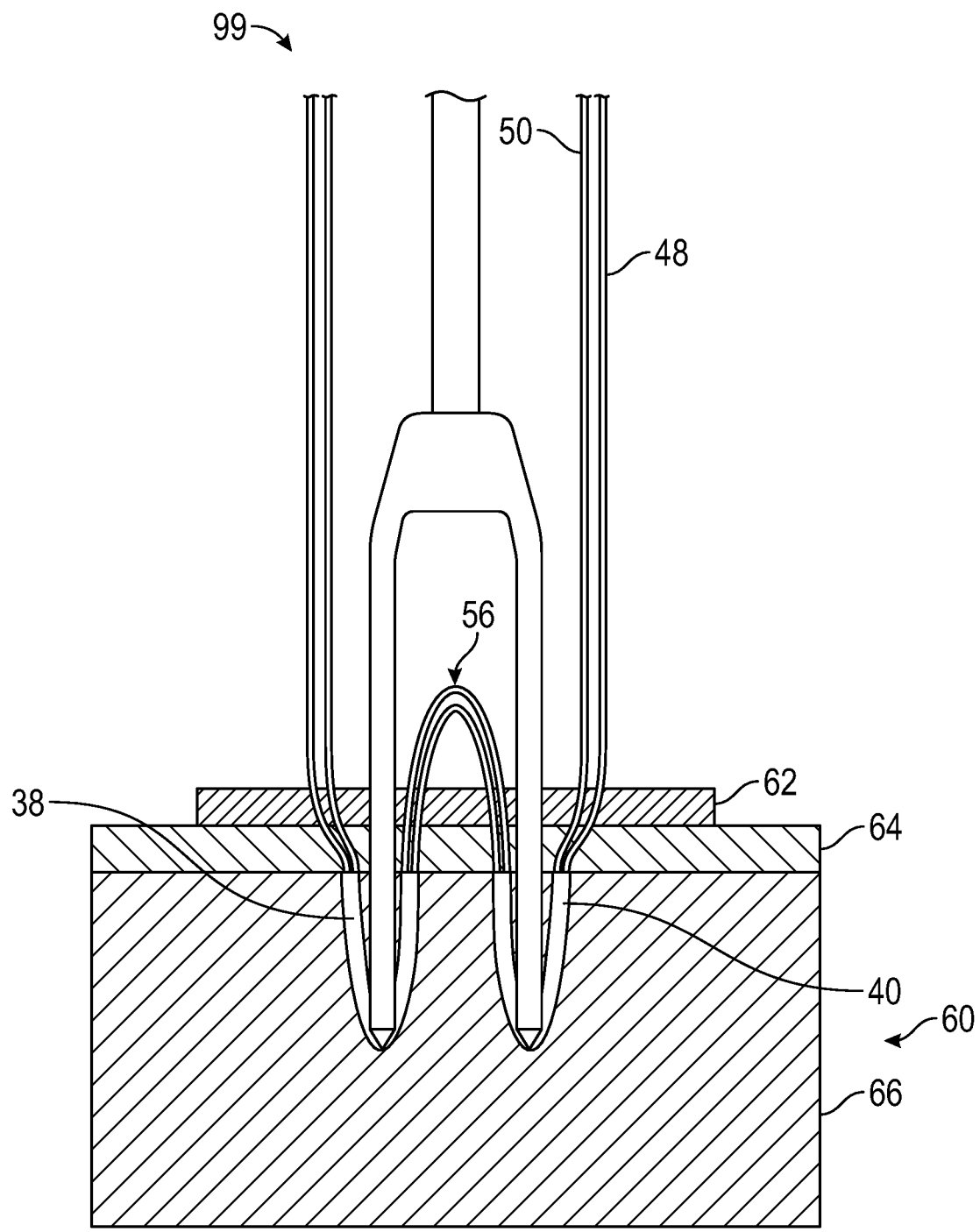
FIG. 6 schematically illustrates an exemplary surgical use of a surgical tool assembly for introducing suture anchors to a surgical site.

FIG. 6 schematically illustrates an exemplary use of the surgical tool assembly 99 for introducing the anchors 38, 40 to a surgical site 60. In some embodiments, the surgical site 60 is located at the joint 10 of FIG. 1. However, other implementations are also contemplated within the scope of this disclosure.

During implantation, the prongs 28 and 30 of the surgical tool 22 may pierce through a graft 62, soft tissue 64, and bone 66 to seat the anchors 38, 40 into the bone 66. The sutures, such as those in any of the exemplary configurations shown in FIGS. 5A-5F, may then be tensioned to compress the graft 62 against the tissue 64, and both the graft 62 and the tissue 64 against bone 66. The bridge portions 56 of the sutures may be opposite the graft 62 and the tissue 64 from the bone 66, thereby allowing the sutures 48, 50 to compress the graft 62 against the tissue 64 and the graft 62 and tissue 64 against the bone 66 in response to a tensioning force. Althought the bridge portions 56 are referenced in the figure, the bridges formed in any of the configurations shown in FIGS. 5A-5E may be utilized.

Figure 7:
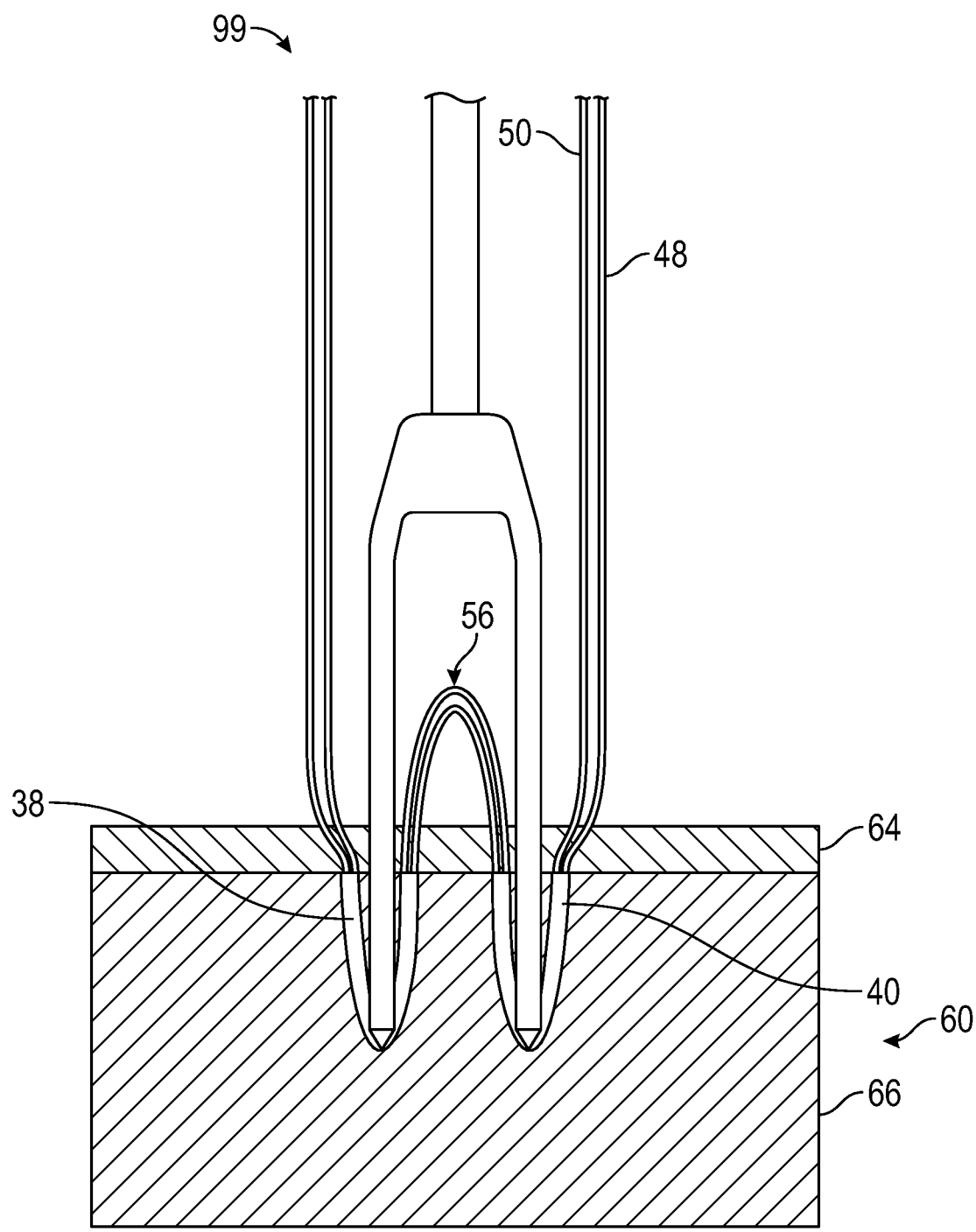
FIG. 7 schematically illustrates another exemplary surgical use of a surgical tool assembly for introducing suture anchors to a surgical site.

In some embodiments, as shown in FIG. 7, a graft 62 may not be used, and the anchors 38, 40 are inserted through soft tissue 64 and seated into bone 66 to compress the soft tissue against the bone 66.

In some embodiments, the surgical tool 22 allows reproducible positioning of the anchors 38, 40 relative to another in a single insertion step. The two anchors 38, 40 may be introduced simultaneously at a predetermined distance apart. In some embodiments, more than two prongs 28, 30 and/or anchors 38, 40 may be utilized in a single surgical tool.

Figure 8A:
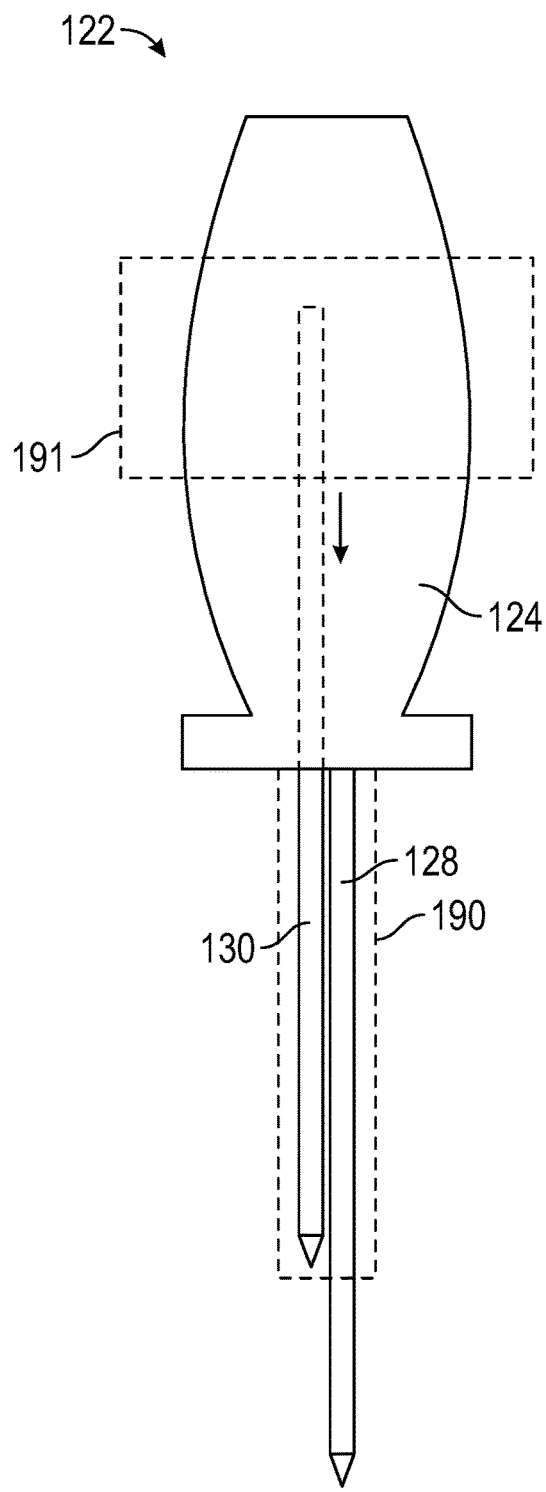
FIG. 8A illustrates another exemplary surgical tool.

FIG. 8A illustrates another example surgical tool 122 that may be used in a surgical procedure, such as a graft augmentation technique, for example, and used as a surgical tool assembly with any of the exemplary suture anchor and suture configurations for the suture anchors 38, 40 disclosed herein. The example tool includes a handle 124 and prongs 128 and 130 extending from the handle 124. An outer sheath 190 may receive at least a portion of each of the prongs 128 and 130. The prong 128 may be fixed, and a mechanism 191 (shown schematically) may be utilized to advance the prong 130 distally when desired.

Figure 8B:
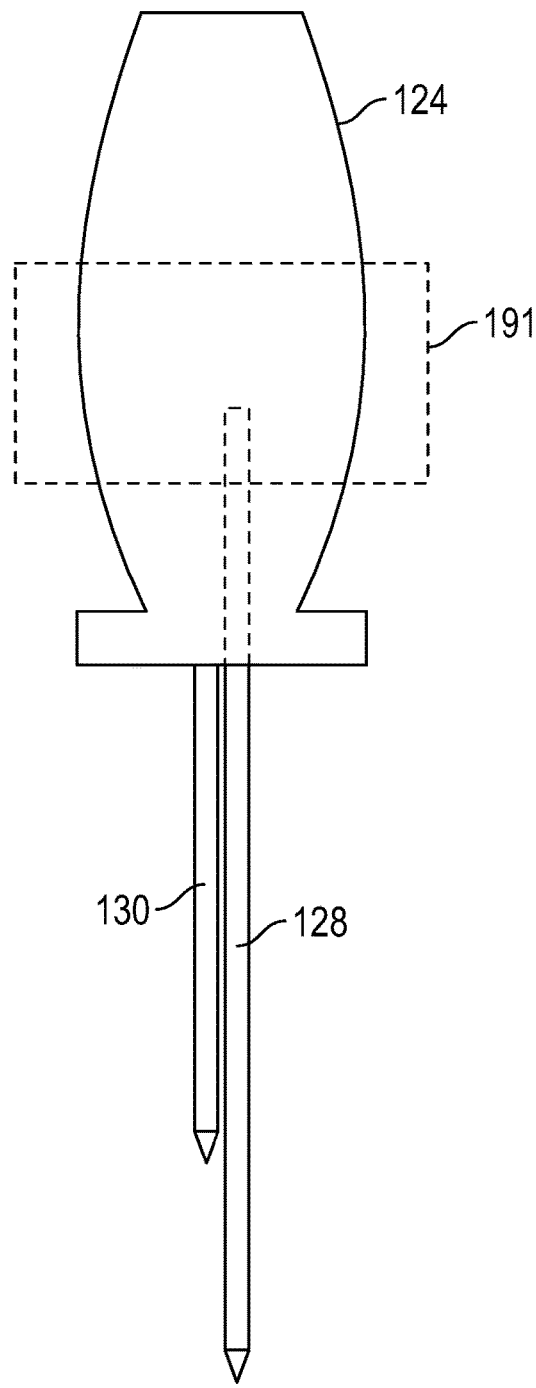
FIG. 8B schematically illustrates an additional or alternative function of the exemplary surgical tool of FIG. 8A.

Alternatively or additionally, as shown in FIG. 8B, the mechanism 191 may be utilized to retract prong 128 proximally when desired. In an embodiment, the prong 130 may be fixed.

Figure 9:
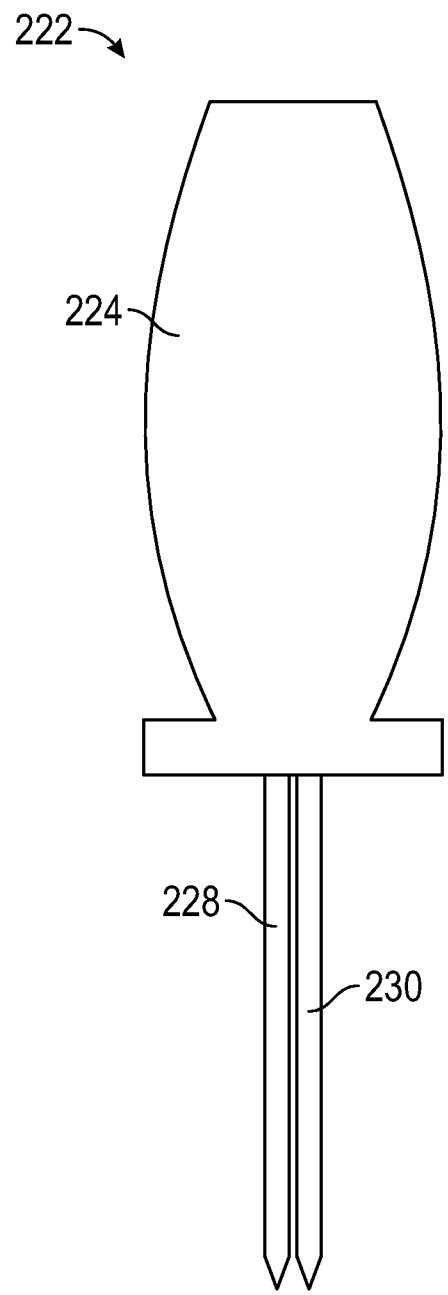
FIG. 9 illustrates another exemplary surgical tool.

FIG. 9 illustrates another example surgical tool 222 that may be used in a surgical procedure, such as a graft augmentation technique, for example, and used as a surgical tool assembly with any of the exemplary suture anchor and suture configurations for the suture anchors 38, 40 disclosed herein. The example tool includes a handle 224 and fixed prongs 228 and 230 extending from the handle 224.

The exemplary surgical tools 22/122/222 of this disclosure may be utilized in various graft augmentation techniques. These techniques may include superior capsular reconstruction, in some embodiments. In other embodiments, the exemplary surgical tools 22/122/222 may be utilized in any technique where a graft may be positioned against soft tissue and/or bone.

In some embodiments, only one of the anchors 38, 40 may be seated into bone. In some embodiments, the graft 62 may include either an allograft or an autograft. In some embodiments, the graft 62 is an acellular dermal extracellular matrix. ArthroFlex®, sold by Arthrex, Inc., is one type of graft 62 suitable for use to perform an exemplary graft augmentation technique. In some embodiments, the graft 62 may be a suture patch or any other synthetic augmentation. The sutures 48, 50 may include suture strands, suture tape, any other suture-like product, or any thread-like material.

A method according to this disclosure may include delivering a surgical tool, such as any of the surgical tools 22/122/222 described herein, to a surgical site. The method includes inserting, simultaneously, first and second prongs of the surgical tool through a soft tissue. The method includes removing the first and second prongs, such that the first and second anchors remain at the surgical site. In some embodiments, the anchors are implanted into bone and the anchors remain seated in the bone. In some embodiments, the method may include tensioning one or more sutures interconnecting the anchors for achieving graft and/or soft tissue compression.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A method, comprising:
   delivering a surgical tool assembly to a surgical site, the surgical tool assembly including a pronged surgical tool, a first anchor including a first tubular sheath having first and second leg portions extending proximally from a connecting portion, and a second anchor including a second tubular sheath interconnected to the first anchor by a first suture and a second suture, wherein the first suture is spliced through the second suture;
   inserting, simultaneously, a first prong and a second prong of the pronged surgical tool through a soft tissue and a bone, wherein the first prong includes first and second pointed distal tips and provides a first saddle therebetween, the second prong includes third and fourth pointed distal tips and provides a second saddle therebetween and, during the delivering step, the connecting portion is received against the first saddle, and the second tubular sheath is received against the second saddle; and
   removing the first and second prongs, such that the first and second anchors remain at the surgical site, wherein:
      a first free end of the first suture exits the first tubular sheath from the first leg portion, and a first free end of the second suture exits the first tubular sheath from the second leg portion,
      the second tubular sheath includes third and fourth leg portions extending proximally from a second connecting portion, wherein a second free end of the first suture exits the second tubular sheath from the third leg portion, and a second free end of the second suture exits the second tubular sheath from the fourth leg portion,
      the first suture is spliced through the second suture within the second tubular sheath at a first splice section, and the second suture is spliced through the first suture within the first tubular sheath at a second splice section, and
      the first and second sutures are spliced through the first free end of the first suture at a third splice section external to the first and second tubular sheaths, and the first and second sutures are spliced through the second free end of the second suture at a fourth splice section external to the first and second tubular sheaths.

2. The method of claim 1, wherein the first suture splices through the first free end of the first suture at the third splice section as it passes from the second leg portion to the fourth leg portion.

3. The method of claim 2, wherein the second suture splices through the second free end of the second suture at the fourth splice section as it passes from the third leg portion to the first leg portion.

4. The method of claim 3, wherein the first free end of the second suture splices through the first free end of the first suture at the third splice section, and the second free end of the first suture splices through the second free end of the second suture at the fourth splice section.

5. The method of claim 1, wherein the second suture splices through the second free end of the second suture at the fourth splice section as it passes from the third leg portion to the first leg portion.

6. A method, comprising:
   delivering a surgical tool assembly to a surgical site, the surgical tool assembly including a pronged surgical tool including a first prong providing a first saddle and a second prong providing a second saddle, a first anchor including a first tubular sheath having first and second leg portions extending proximally from a first connecting portion received against the first saddle, and a second anchor including a second tubular sheath having third and fourth leg portions extending proximally from a second connecting portion received against the second saddle, wherein the first anchor and the second anchor are interconnected by a first suture passing through the first tubular sheath and the second tubular sheath, a second suture passes through the first tubular sheath and the second tubular sheath, and the second suture is spliced through the first suture;
   inserting, simultaneously, the first prong and the second prong through a soft tissue and a bone;
   removing the first and second prongs, such that the first and second anchors remain at the surgical site: and
   tensioning the first suture and the second suture, wherein
      a first free end of the first suture exits the first tubular sheath from the first leg portion, and a first free end of the second suture exits the first tubular sheath from the second leg portion;
      a second free end of the first suture exits the second tubular sheath from the third leg portion, and a second free end of the second suture exits the second tubular sheath from the fourth leg portion;
      the first suture is spliced through the second suture within the second tubular sheath at a first splice section, and the second suture is spliced through the first suture within the first tubular sheath at a second splice section;
      the first and second sutures are spliced through the first free end of the first suture at a third splice section external to the first and second tubular sheaths, and the first and second sutures are spliced through the second free end of the second suture at a fourth splice section external to the first and second tubular sheaths;
      the first suture splices through the first free end of the first suture at the third splice section as it passes from the second leg portion to the fourth leg portion;
      the second suture splices through the second free end of the second suture at the fourth splice section as it passes from the third leg portion to the first leg portion; and
      the first free end of the second suture splices through the first free end of the first suture at the third splice section, and the second free end of the first suture splices through the second free end of the second suture at the fourth splice section.

* * * * *